April 10, 1956     I. W. EDWARDS     2,741,752
RAIL BOND
Filed June 8, 1951
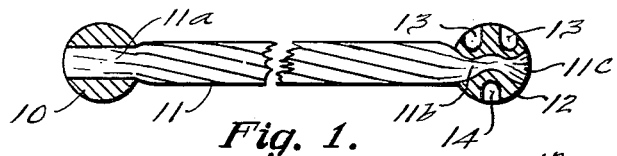
Fig. 1.
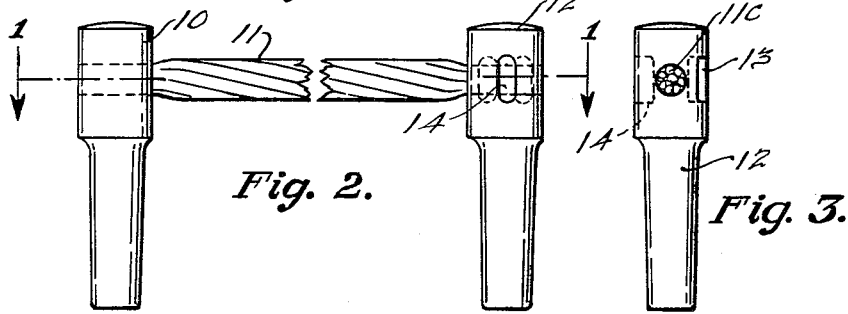
Fig. 2.     Fig. 3.
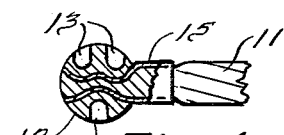      
Fig. 4.     Fig. 6.     Fig. 8.
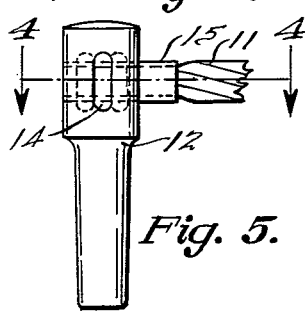   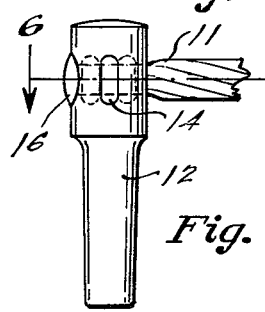   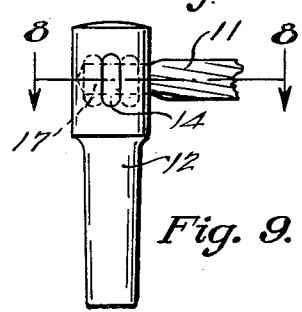
Fig. 5.     Fig. 7.     Fig. 9.
Fig. 10.
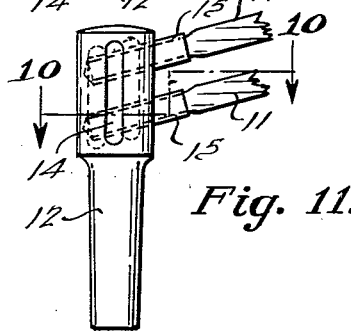
Fig. 11.
INVENTOR.
*Irving W. Edwards*
BY *Elmer Jamison Gray*
ATTORNEY.

United States Patent Office 2,741,752
Patented Apr. 10, 1956

2,741,752

RAIL BOND

Irving W. Edwards, Detroit, Mich.

Application June 8, 1951, Serial No. 230,658

5 Claims. (Cl. 339—276)

This invention relates to improvements in rail bonds for the maintenance of electrical continuity of track circuits commonly in use for signaling on railroads. The bond usually comprises a flexible electrical conductor or cable extending between adjacent ends of two rails, each end of the cable being attached to a stud or terminal member rigidly anchored within a hole in the rail. The present invention relates to improvements in the connections between the ends of the conductor cable and the studs or terminal members whereby dependable and durable electrical contacts of a high degree of conductivity may be assured.

An important object of the invention is to provide a permanent mechanical locking grip of the end of the cable wihin a hole in the terminable stud, this being accomplished by forcing or driving portions of the metal inwardly to provide indentations or depressions in opposite sides of the stud in staggered relation, thereby compacting the cable end and deforming it into substantially serpentine contour so as to effectively lock or anchor the cable within the stud. This construction has the further advantage on enabling the extent and effectiveness of the mechanical pressure, applied in forming the cable and stud interlock, to be accurately and visually gauged by simple inspection of the stud and the depth of the indentation. As a further advantage the present invention may be applied to rail bonds wherein the ends of the conductor cable are sleeved, through-welded, blind fitted or angularly attached, and may also be used in connection with multiple cable constructions.

Other objects of this invention will appear in the following description and appended claims, reference being had to the accompanying drawings forming a part of this specification wherein like reference characters designate corresponding parts in the several views.

Fig. 1 is a longitudinal sectional view of a rail bond embodying the present invention and taken substantially through lines 1—1 of Fig. 2 looking in the direction of the arrows.

Fig. 2 is a plan view of the rail bond illustrating at the left-hand side of the figure one end of the cable reduced in diameter and inserted through a hole in a terminal stud and illustrating at the right-hand side of the view the opposite end of the cable upset or swaged within a hole in a terminal stud in accordance with the present invention.

Fig. 3 is an end view of the rail bond taken from the right-hand side of Fig. 2.

Fig. 4 is a fragmentary sectional view of the rail bond taken substantially through lines 4—4 of Fig. 5 looking in the direction of the arrows, and illustrating a modification.

Fig. 5 is a fragmentary plan view of the rail bond illustrated in Fig. 4.

Fig. 6 is a fragmentary sectional view of a modified rail bond taken substantially through lines 6—6 of Fig. 7 looking in the direction of the arrows.

Fig. 7 is a fragmentary plan view of the rail bond illustrated in Fig. 6.

Fig. 8 is a fragmentary sectional view of a modified rail bond taken substantially through lines 8—8 of Fig. 9 looking in the direction of the arrows.

Fig. 9 is a fragmentary plan view of the rail bond illustrated in Fig. 8.

Fig. 10 is a fragmentary sectional view of a modified rail bond taken substantially through lines 10—10 of Fig. 11 looking in the direction of the arrows.

Fig. 11 is a fragmentary plan view of the rail bond shown in Fig. 10.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there are illustrated, by way of example, various embodiments of the present invention by which the ends of a multiple strand conductor cable are permanently anchored within a hole in a terminal stud, which is adapted to be attached to a rail, so as to provide a connection which will withstand more effectually than heretofore the vibrations and impacts resulting from the operation of trains travelling at high speeds over the rails. The connections between the ends of the cable and the terminal studs are also such as to resist weather corrosion and thereby prolong the life of the rail bond.

In the embodiment illustrated in Figs. 1 to 3 inclusive the rail bond comprises a multiple strand cable 11 which, when the bond is completed, is anchored at opposite ends within terminal studs 10 and 12. Each of these studs has a projecting shank which is attached in any suitable manner to an end of the rail. As shown at the left-hand side of Figs. 1 and 2, the cable 11 is reduced in diameter at its end by swaging and fitted into a transverse hole in the stud 10. The manner in which the end of the cable is anchored within the stud is shown at the right-hand side of Figs. 1 and 2. The body of the stud 12 adjacent the terminal end is rigidly confined within a die or other suitable means so as to prevent outward displacement or expansion thereof, and when so confined the stud 12 is subjected to pressure at opposite sides at staggered points to provide inwardly directed indentations or grooves 13 and 14. As shown in Figs. 1 and 2, two spaced indentations 13 are formed at one side of the stud by forcing portions of the metal thereof inwardly, and simultaneously an indentation 14 is formed at the opposite side of the stud by forcing a portion of the metal inwardly toward the terminal end. Since the indentations 13 and 14 are staggered with the indentation 14 directed inwardly on a line extending between the indentations 13, the end of the cable 11b will be deformed in generally serpentine fashion to provide a plurality of permanent bends in the length thereof.

By first swaging the end of the cable, as shown at 11a, to reduce the diameter thereof the end of the cable will be compacted to reduce the voids or interstices between the cable strands or wires. Thereafter by forcing portions of the metal of the stud inwardly at staggered points, while restraining the stud from expansion or outward displacement, the reduced end of the cable will be further compacted and rendered substantially free of voids or interstices thereby reducing the tendency of corrosion. The formation of the indentations 13 and 14 under heavy pressure thus compacts the end of the cable, deforms the same by forming longitudinal bends therein and results in permanently locking or anchoring the end of the cable within the stud.

The fact that the indentations 13 and 14 are simultaneously made only while the terminal 12 is closely confined against outward displacement or spreading of the metal thereof results in internal deformation of the cable end and a flow of the cable material in a direction to fill the interstices or voids between the wires of the cable. It will be noted that the end 11c of the cable as well as the end of the hole in the stud flares outwardly thereby increasing the effective locking action of the cable within the stud.

It will be understood that a different number of indentations may be formed in the end of the stud to produce the locking action. For example, the end of he stud may be larger and rectangular in cross-section, and in such event there may be provided at opposite sides of the stud a staggered series of indentations comprising, for example, three indentations on one side and four on the other side. Such indentations, simultaneously formed in the stud, will deform the end of the cable into serpentine contour and will produce a permanent number of bends in the length thereof within the hole in the stud.

It is desirable in most instances, in order to increase the available metal of the stud within which the end of the cable is to be anchored, to sewage the end of the cable and reduce its diameter as shown at 11a prior to fitting the same into a hole in the stud. This permits use of a smaller hole in the stud while also reducing the amount of swaging subsequently needed to reduce the end of the cable to substantially a solid formation free of voids. In the preferred construction the depth of the indentations 13 and 14 is preferably calculated so that the total volume of the indentations will equal or proximate the total valume of the voids between the wires or strands of the cable. Thus, the depth of these indentations may serve as a gauge of the effectiveness of the locking action obtained.

In the embodiment of Figs. 4 and 5 the construction and method employed is the same as above described. In this instance, however, each end of the cable 11, after swaging to reduce the diameter thereof, is confined within a metal sleeve 15. This construction is desirable in some instances particularly as a reinforcement for the end of a flexible cable composed of relatively fine wires or strands. The sleeved end of the cable is then inserted within a hole in the end of the stud 12 and the latter is formed under pressure with staggered indentations in the same manner as previously described.

In the embodiment of Figs. 6 and 7 the construction and method employed is the same as that described in connection with Figs. 1 to 3 inclusive, differing therefrom only in the fact that the ends of the wires or strands of the cable are welded together at 16 and to the stud 12 so as to increase the electrical conductivity.

In the embodiment of Figs. 8 and 9 the construction and method employed are the same as described above in connection with Figs. 1 to 3 inclusive, differing therefrom only in the fact that the reduced end of the cable is fitted into a blind hole 17 in the end of the stud 12. The reduced end of the cable is first inserted into the blind hole to the bottom thereof and thereafter the stud and cable are swaged or crimped to provide staggered indentations 13 and 14 as previously described.

Figs. 10 and 11 illustrate the manner in which the invention may be applied to a rail bond in which a plurality of cables 11 are attached angularly to the end of the stud 12. The construction here shown may be used in connection with the angular attachment of a single cable or a plurality of cables. In this instance the reduced end of each cable 11 is confined within a metallic sleeve 15, and the twin cables are inserted into two blind holes in the end of the stud. Thereafter the stud is formed under heavy pressure to provide the staggered indentations 13 and 14 in the same manner as previously described in connection with Figs. 1 to 3 inclusive. Due to the spacing of the ends of the cables within the spaced holes in the stud, the indentations or depressions 13 and 14 are necessarily longer so as to deform the cable endwise in the manner illustrated and permanently anchor the same within the end of the stud.

I claim:

1. In a rail bond, a stud adapted to be anchored at its inner end to a rail and having a diametrical hole adjacent its outer end, said hole being constricted intermediate its ends transversely of the stud to provide oppositely flared ends, am ulti-strand conductor cable having one end fitted into said hole and having flared portions within said flared ends, the portion of the cable intermediate its flared portions being compacted transversely of said stud and hole with respect to said flared portions, said stud being formed with parallel elongate indentations extending longitudinally thereof including an indentation along an axial plane of said stud at one side of said cable and a pair of indentations spaced by said axial plane at the opposite side of the cable adjacent and intermediate said flared ends, the metal of said stud inwardly of said indentations being compacted tightly against the compacted portion of said cable and holding the latter in serpentine form convoluted transversely of said stud.

2. In a rail bond, a stud adapted to be anchored at its inner end to a rail and having a diametrical hole adjacent its outer end, said hole being constricted intermediate its ends transversely of the stud to provide oppositely flared ends, a multi-strand conductor cable having a compacted end of reduced diameter fitted snugly into said hole and having flared portions within said flared ends, the portion of the cable end intermediate its flared portions being compacted transversely of said stud and hole with respect to said flared portions, said stud being formed with parallel elongate indentations extending longitudinally thereof including an indentation along an axial plane of said stud at one side of said cable end and a pair of indentations spaced by said axial plane at the opposite side of the cable end adjacent and intermediate said flared ends, the metal of said stud inwardly of said indentations being compacted tightly against said cable end and holding the latter in serpentine form convoluted transversely of said stud.

3. The method of anchoring an end of a multiple strand cable to a rail bond stud comprising forming a diametrical hole in said stud adjacent its outer end to receive the cable end snugly therein, fitting the cable end snugly into said hole, confining said stud to restrain the metal thereof against outward displacement, compacting and forming said cable end into generally serpentine form convoluted transversely of the stud and simultaneously forcing portions of the metal of the stud inwardly against the cable by forming parallel elongate indentations in the stud longitudinally thereof and transversely of said cable end, including an indentation along an axial plane of the stud at one side of said cable end and a pair of indentations at the opposite side of said cable end spaced by said plane and adjacent the ends of the diameter of said stud along which said hole extends.

4. The method of anchoring an end of a multiple strand cable to a rail bond stud comprising forming a diametrical hole in said stud adjacent its outer end to receive the cable end snugly therein, fitting the cable end snugly into said hole, confining said stud to restrain the metal thereof against outward displacement, constricting said hole intermediate its ends transversely of said stud to provide oppositely flared ends and corresponding oppositely flared portions of said cable end and simultaneously compacting and forming said cable end intermediate said flared portions into generally serpentine shape convoluted transversely of said stud and also forcing portions of the metal of the stud inwardly against the cable by forming parallel elongate indentations in the stud longitudinally thereof and transversely of said cable end, including an indentation along an axial plane of the stud at one side of said cable end and a pair of indentations at the opposite side of said cable end spaced by said plane and adjacent the ends of the diameter of said stud along which said hole extends.

5. The method of anchoring an end of a multiple strand cable to a rail bond stud comprising forming a diametrical hole in said stud adjacent its outer end and of smaller diameter than the diameter of said cable, swaging the end of the cable to reduce the diameter thereof, fitting the cable end snugly into said hole, confining said stud to restrain the metal thereof against outward displacement, constricting said hole intermediate its ends transversely of said stud to provide oppositely flared ends and corresponding oppositely flared portions of said cable end and simultaneously compacting and forming said cable end intermediate said flared portions into generally serpentine shape convoluted transversely of said stud and also forcing portions of the metal of the stud inwardly against the cable by forming parallel elongate indentations in the stud longitudinally thereof and transversely of said cable end, including an indentation along an axial plane of the stud at one side of said cable end and a pair of indentations at the opposite side of said cable end spaced by said plane and adjacent the ends of the diameter of said stud along which said hole extends.

References Cited in the file of this patent

UNITED STATES PATENTS

| | | |
|---|---|---|
| 1,017,285 | Deviese | Feb. 13, 1912 |
| 1,426,397 | Linderman | Aug. 22, 1922 |
| 2,008,786 | Febrey | July 23, 1935 |
| 2,222,609 | Everett | Nov. 26, 1940 |
| 2,276,140 | Andren et al. | Mar. 10, 1942 |
| 2,345,631 | Roberts | Apr. 4, 1944 |
| 2,416,883 | Selquist | Mar. 4, 1947 |
| 2,480,280 | Bergan | Aug. 30, 1949 |
| 2,601,462 | Streader | June 24, 1952 |
| 2,604,570 | Aversten | July 22, 1952 |

FOREIGN PATENTS

| | | |
|---|---|---|
| 192,225 | Switzerland | Oct. 1, 1937 |
| 552,214 | Great Britain | Mar. 26, 1943 |